Oct. 28, 1958 — A. W. MALL — 2,857,942
SAW CHAIN
Filed June 7, 1955 — 2 Sheets-Sheet 1
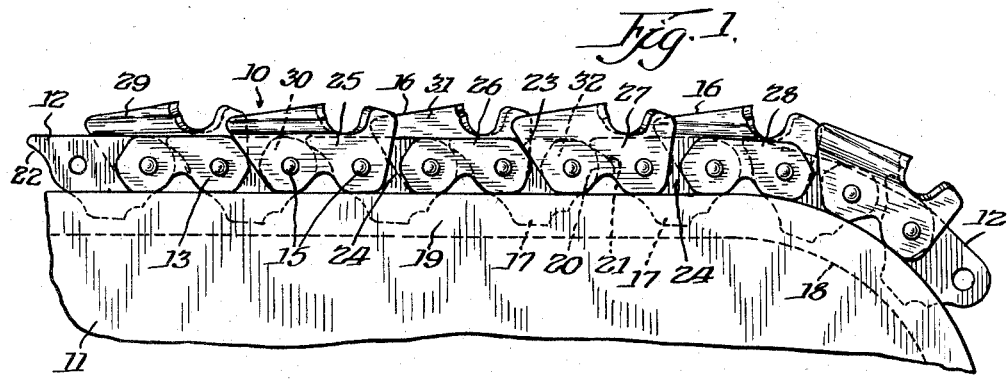
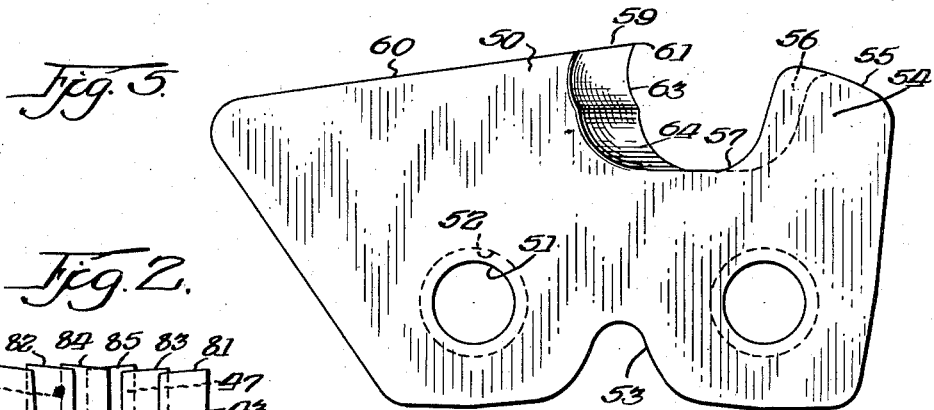
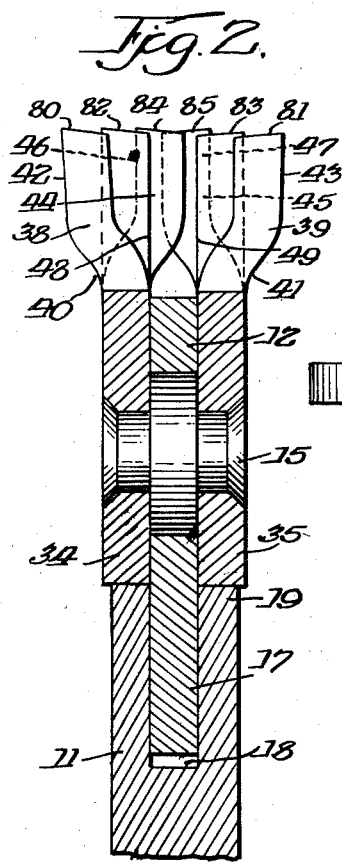
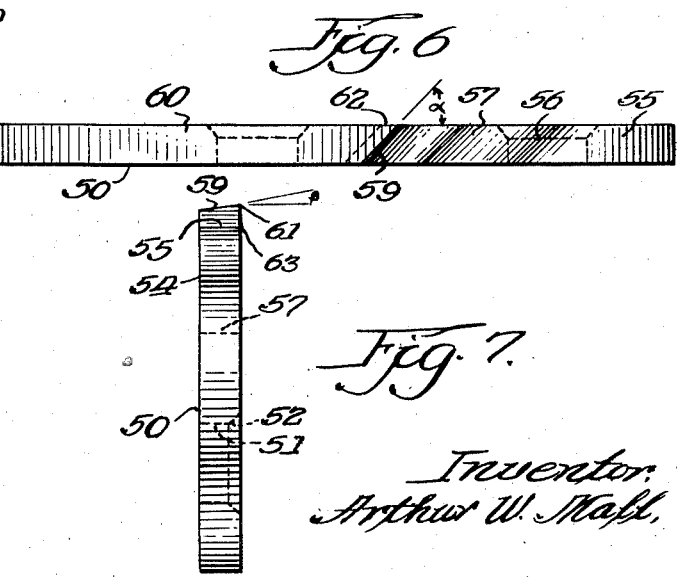
Inventor:
Arthur W. Mall,
By John Bundock Jr.

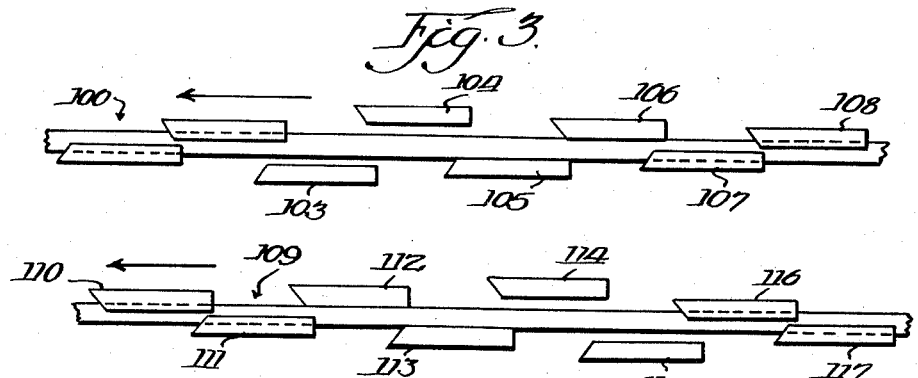
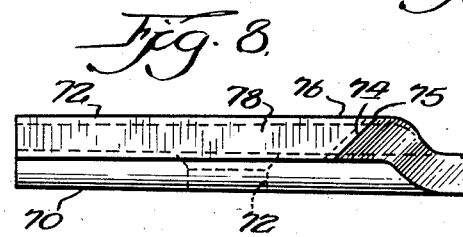
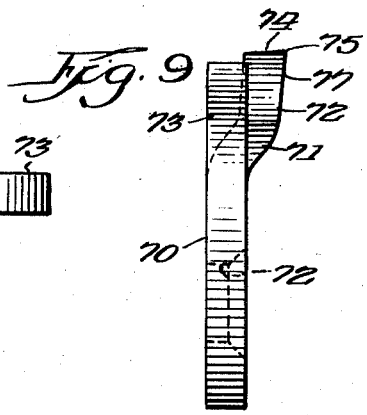
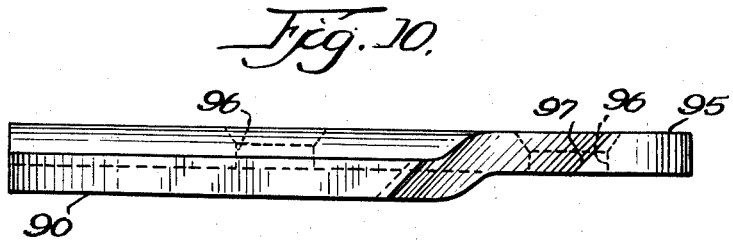
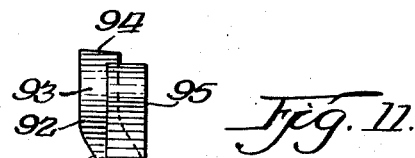

United States Patent Office 2,857,942
Patented Oct. 28, 1958

2,857,942
SAW CHAIN

Arthur W. Mall, Flossmoor, Ill., assignor to Mall Tool Company, Chicago, Ill., a corporation of Illinois Application June 7, 1955, Serial No. 513,690

1 Claim. (Cl. 143—135)

This invention relates to a saw chain and more particularly to a chain for sawing wood comprised of pairs of side links and center spacer links between the side links, riveted together to form the chain, with kerf bottom chisel cutting edges provided on cutters carried on certain of the side links of the chain.

The saw chain is made with longitudinally spaced intermediate and inside cutter links which are provided with similarly detailed chisel edge saw teeth for shaving or planing the bottom of the kerf and outside cutter links fashioned with the same chisel edge saw teeth, which cut both the side and a portion at each margin of the bottom of the kerf. Thus the saw teeth to form the kerf, simultaneously cut a plurality of overlapping grooves in the bottom of the kerf, and each saw tooth chisels smoothly and evenly the length of the kerf with a thin shaving curling off the cutting edge which, particularly in cutting wood cross grain, is broken up into fine sawdust particles by the violent movement of the saw chain forcing its way through the kerf.

This invention has as a principal object the provision of a saw chain with all cutters operating to cut out the kerf, each cutter slicing its own individual groove in the bottom of the kerf and cooperating with other cutters of a plurality making up a sequence to cut the full width of the kerf.

Another object of this invention is to achieve more uniform and smoother cutting action with a substantial reduction in high speed lateral sway of the saw chain on the guide bar as commonly experienced in the cutting action of conventional saw chain. To achieve this each cutter is preferably formed with a flat back and a uniformly similar chisel cutting edge on the face of the tooth. To further improve the cutting action by preventing lateral movement or roaming of the chain in the cut, the cutters are arranged in a sequence in the chain which provides for balancing the sideways pressure on each link against another link in the plurality making up a sequence.

A further object of the invention is to provide a freer cutting chain having improved chip clearance which results in less frictional loss during operation of the chain. The sawdust produced by the cutters is of uniform fine particle size and is purposely so maintained, to prevent clogging and packing in front of the cutting edges on the links and beside the other links of the chain. This fine sawdust flowing past the links as the chain is forced through the cut is scavenged and cleared from the kerf by the entire saw chain rather than by a special scavenging element. The sawdust particles move back through the chain and also are forced past the side links to flow between the guide bar and the walls of the kerf. As the saw drops through a vertical cut large quantities of fine sawdust which are jammed against the rough walls of the kerf are passed by the chain and guide bar which results particularly in long cuts, in a condition where freely moving sawdust is crowded across the entire width of the guide bar to be carried out of the kerf by the return loop of the chain which travels along the top edge of the guide bar. A similar condition exists in horizontal or felling cuts where the sawdust moves past the side links of the chain next to the guide bar to be carried out of the cut by the return loop of the chain. The production of sawdust of extremely fine particle size which flows in and around the cutters on the chain and next to the guide bar to be conveyed or scavenged from the cut by the links on the return loop of the chain, results in an increased sawdust carrying capacity and a chain operating with less timber bind and with a higher cutting speed.

Another object is to improve the cutting efficiency both in straight cutting and in boring or plunge cutting by providing a cutter of great durability, easily sharpened, and with self-feeding characteristics when making both types of cuts.

A still further object is to provide each cutter in the chain with a depth gauge to regulate the bite taken by the cutting edge, having a vertical back edge ground at an angle with respect to the side of the cutter link, to provide a permanent guide to positioning a file or grinding wheel at the correct angle in touching up or resharpening the cutter.

Other objects will appear from the following drawings in which:

Fig. 1 is a side elevation of an assembled chain according to this invention shown on a portion of the guide bar;

Fig. 2 is a front diagrammatic view of the saw chain of this invention;

Fig. 3 is a diagrammatic view of cutters making up a chain sequence;

Fig. 4 is a diagrammatic view of cutters making up another chain sequence;

Fig. 5 is a side elevation of an intermediate cutter link of the saw chain;

Fig. 6 is a plan view of the cutter link of Fig. 5;

Fig. 7 is a front view of the cutter link of Fig. 5;

Fig. 8 is a plan view of an outside cutter link of the saw chain;

Fig. 9 is a front view of the cutter link of Fig. 8;

Fig. 10 is a plan view of an inside cutter link of the saw chain;

Fig. 11 is a front view of the cutter link of Fig. 10

The saw chain 10 shown in Fig. 1 lies on a guide bar 11 extending partially around the rounded nose of the guide bar, and in actual use on a saw chain would be trained completely around a guide bar and driving sprocket for operating as a saw. The chain 10 is made up of center spacer links 12 and side links 13 arranged in pairs and riveted together through openings in the center spacer links by means of rivets 15 to form a complete chain. The center spacer links 12 and slide links 13 are formed from strip steel, blanked and formed with rivet openings by blanking and punching operations carried out in a punch press. Each of the links is heat treated and may be plated with a hard material such as chromium or the like to withstand wear and increase the abrasive resisting qualities of the link.

It will be observed that the chain of this invention is formed with pairs of side links, one of which bears a saw tooth or cutter 16 and which for convenience in terminology will be hereinafter described as a side cutter link to distinguish it from the side link (designated by lead line 13) which carries no cutter element.

The center spacer link 12 has a tang 17 which slides in the guide bar groove 18 (Fig. 2) which is milled or ground in the edge of the guide bar. The side links of the chain rest on the hardened surface of the rails 19 of the guide bar.

The saw chain 10 shown in Fig. 1 is constructed to prevent bending of the chain back in the manner opposite to the way the chain normally bends to travel around the guide bar and sprocket. This is termed in the art a "lock up" feature and is well-known in the art, being supplied in the saw chain of this invention to achieve special advantages. To produce this lock up feature all spacer links 12 are provided with a rounded nose 20 and a tail 21 with a curved under portion 22 adapted to rest on and conform to the rounded nose 20 of the next following spacer link.

Further, on each side of the chain are found side links and side cutter links, certain of which abut against each other. The side cutter links are provided with flat front and rear edges inclined slightly to the vertical. The side links 13 have rounded front and rear edges with a flat portion 23 on the front of the link adapted to abut against the next preceding side cutter link. The saw chain can be made with all spacer links abutting against each other, and with all side links and side cutter links abutting front and back against each other but in the preferred form shown in Fig. 1 although all spacer links are so related in the chain, the side cutter links and side links are arranged with gaps 24 between adjacent pairs. The gaps 24 appear in staggered sequence down the chain as will become apparent from Fig. 1 where it will be noted that on the side of the chain shown in solid lines gaps 24 appear between links 25, 26 and links 27, 28, while on the opposite side of the chain the gaps 24 appear between links 29, 30 and 31, 32 staggered in relation to the gaps on the first side of the chain.

The lock-up feature prevents individual cutters from tipping forward about the front rivet which is possible in chains not provided with this feature. A link which toggles or tips forward about the front rivet, gouges and cuts unevenly.

Referring more particularly to the cutters embodied in this saw chain, in Fig. 2 which is a diagrammatic showing of a plurality of cutters making up a sequence, the side links 34 and 35 are shown riveted together by means of a rivet 15, to spacer link 12 which is provided with tang 17 sliding in the groove 18 of the guide bar 11. Fig. 2 is diagrammatic in that it reveals the relation across the entire kerf width of the plurality of saw teeth or cutters forming a complete sequence in a preferred embodiment of this saw chain. As shown, such a sequence includes a pair of similarly formed left and right hand outside saw tooth or cutter elements 38, 39 carried on side links of the chain, which are formed outward with curved shank portions 40, 41 and substantially vertical saw tooth or cutter body portions 42, 43.

Left and right hand inside saw teeth or cutters 44, 45 also carried on side links of the chain are formed with curved shanks bending inwardly over the spacer link and with substantially vertical saw tooth body portions 46, 47.

Finally, intermediate saw teeth or cutters 48, 49 having saw tooth or cutter body portions with no form, are carried also on the side links to cut out the kerf bottom between slices made by the outside and inside cutters.

Referring to Fig. 5 which is a side elevation of left hand intermediate cutter link 50 it will be observed that this link is blanked from strip steel, and formed with openings 51, countersunk at 52 to receive rivets for fastening the elements of the chain together. On the bottom of the link there is provided a curved cutout portion 53 which in the assembled chain shown in Fig. 1 will be seen lies between the back and front lower edges of the tangs of preceding and trailing spacer links and is provided to conform to the sprocket teeth of the driving sprocket. The front of the link is provided with a depth gauge 54 having a sloping top edge 55 and a back edge 56 formed at an angle with respect to the side of the blank. The purpose of providing this formed back edge will be described hereinafter. The gullet 57 is provided by grinding and the face of the cutter or saw tooth is fashioned by means of a separate grinding operation to provide the exact cutting edge desired. On the link 50 shown in Fig. 5 the cutting edge 59 is formed so that it may be sharpened with a cylindrical file held at the correct angle and reciprocated. However, in production this edge is produced by a grinding wheel or the like.

A grinding operation is also performed on the blank from which the cutter link is made to produce a flat back 60. The outside and inside cutters are ground after forming to produce the flat back 60 which is formed precisely at right angles to the side of the link 50, and provides a means of quality control by permitting exact control of the dimension between the rivet center and the top of the saw tooth or cutter. Holding this dimension constant the cutter height of all teeth in the chain is uniform, which provides for even cutting.

Cutting edge 59 is formed preferably at a cutting angle Alpha (Fig. 6) and this angle may vary depending upon the cutting conditions, the nature of the wood being cut and other factors determined by the user of the chain. Ordinarily, however, the angle Alpha is between 35° and 45°. In the manufacture of this chain it has been found that a cutting angle of 35° meets general cutting requirements.

Because of the cutting angle Alpha of the cutting edge and since the back 60 of the link recedes at a substantial angle, even though the back 60 is maintained precisely at right angles with respect to the side of the blank, the cutting edge 59 itself lies at an angle Beta with respect to the horizontal (Fig. 7).

The slicing, bottom cutting chisel edge 59 is produced on the face of the cutter by reciprocating a round file held at the correct angle with respect to the link. The file should be held to provide a slight hook on the face of the saw tooth so that the cutting edge 59 slices and shaves as it is dragged along the bottom of the kerf. The tendency of a tooth provided with such an edge is to dig slightly into the wood and this tendency to pull into the wood is counteracted by the depth gauge 54 which slides along the bottom of the kerf in front of the cutting edge. The tendency to dig or pull into the kerf may be varied somewhat by changing the amount of hook on the face of the tooth as for example, by providing a very thin cutting edge and substantial hook which increases the tendency of the cutting edge to pull into the kerf, which may be desirable in cutting certain types of wood. Reducing the hook and providing a substantially vertical edge 63, on the other hand, lessens the tendency of the cutter to pull into the kerf and for cutting certain woods this may be a desirable feature.

A chain made up of side cutter links 50 sharpened as shown in Fig. 5 will satisfactorily cut most types of wood and may be considered a chain adapted for general purpose cutting. It is a notable feature of the chain of this invention, however, that the individual saw teeth may be sharpened in different ways to accommodate the chain to cut various types of wood at the option of the user.

The cutting edge 59 is provided as hereinbefore stated by reciprocating a cylindrical file or by rotating a small grinding wheel held at the correct angle with respect to the side of the link.

As shown in Fig. 6 the back edge 56 of the depth gauge 54 is formed at an angle with respect to the side of the link. In actual production the gullet 57 is formed by a grinding wheel with the lower portion 64 of the face of the cutter and the back edge 56 of the depth gauge being formed by the radial faces of the grinding wheel or disk during the operation of grinding out the gullet.

As the saw chain of this invention is used, and after several resharpenings, substantial material will be removed from the top of the cutter and the cutter will be sharpened back to present a fresh sharp cutting edge to the bottom of the kerf. The depth gauge is correspondingly lowered by filing the top of the depth gauge to maintain the cutting clearance constant throughout the life of the tooth. The back edge 56 angularly disposed with respect to the body of the blank at the cutting angle originally placed on the face of the cutter in production, provides a permanent reference or guide to aid in positioning the cylindrical file at the correct angle during sharpening. The back edge of the depth gauge continues to serve as a reference even after considerable sharpenings and corresponding lowerings of the depth gauge. This feature is of considerable importance since it contributes to the easy maintenance of the saw chain of this invention.

In Fig. 8 a left hand outside cutter link 70 is shown with the front view, Fig. 9, revealing the outwardly curved shank 71 and substantially vertical saw tooth or cutter body 72. As in the case of the intermediate side cutter link 50 the outside cutter link 70 is provided with rivet openings 72 which are adapted to receive rivets to fasten the links of the chain together. It is also provided with a depth gauge 73 which is carried on the front of the link and limits the depth of cut taken by the cutting edge 74 provided on the face of the cutter or saw tooth. Cutting edge 74 is sharpened by reciprocating a cylindrical file or by rotating a small grinding wheel held at the correct angle like for the intermediate link 50, thus providing a point 75 from which recedes the cutting edge 74 and back edge 76 as well as the edge 77 of the face of the cutter.

It will be observed that the outside cutter link 70 is made from the same blank used in making the intermediate cutter link 50, but is formed in a die to provide an outwardly curved shank portion 71 and a substantially vertical but slightly outwardly inclined saw tooth or cutter body portion 72. The saw tooth body 72, it will also be noted, recedes slightly inwardly toward the center line of the chain from the point 75 so as to provide clearance cutting and prevent frictional loss resulting from rubbing along the sides of the kerf. The back 78 of the saw tooth body 72, is ground after the link has been formed, precisely at right angle to the side of the link while receding at a substantial angle from the cutting edge 74. This also reduces frictional loss for the back of the tooth slides clear of the bottom of the kerf as the tooth cuts.

Referring now to Fig. 2 it will be noted that cutting edges 80, 81 of the outside cutter link 38, 39, overlap slightly the cutting edges 82, 83 provided on the intermediate cutters 48, 49. This is to insure that, particularly in ripping cuts, the entire kerf bottom is cut by a cutting edge provided on a saw tooth or cutter of the chain.

A similar relationship is maintained between the intermediate cutters 48, 49 and the inside cutters 44, 45 (Fig. 2) and it will be noted that the cutting edges 84, 85 on said intermediate cutters slightly overlap the cutting edges 82, 83 on the intermediate cutters.

A left hand inside cutter carried on the saw chain of this invention is shown in Fig. 10 where the cutter link 90 is provided with a curved shank portion 91 and a substantially vertical saw tooth or cutter body portion 92 provided on its front face 93 with a cutting edge 94. A depth gauge 95 is carried on the front of the cutter link 90 and is employed to limit the depth of the cut taken by the cutting edge 94. Like in the manufacture of the outside cutter link 70 of Fig. 8 the inside cutter link of Fig. 10 is formed from the same blank as the intermediate cutter link 50. The blank, however, is placed in a die and formed with a shank portion 91 curved in the opposite direction and a substantially vertical cutter body portion 92 to provide the cutting edge 94 over the center line of the saw chain. The right hand inside cutter would be formed in a like manner.

This inside cutter link is sharpened in the same manner that the other cutter links of the chain are sharpened, with a cylindrical file held at the correct angle and reciprocated across the face of the cutter or by means of a small grinding wheel rotated by a power drill or the like. Here, also, the amount of hook which is placed on the face of the cutter link may be varied depending upon the desired cutting characteristics. It is important, however, that all cutter links in the chain be sharpened similarly, to provide even cutting and to prevent sidesway and lateral roaming of the saw chain in the cut.

The inside cutter link 90 is also provided with rivet openings 96 adapted to receive rivets spun or swaged in place to hold the links of the chain together. As has been described in connection with the intermediate side cutter links 50 and as is the case with the outside cutter links 70, the back edge 97 of the depth gauge 95 of the inside cutter link 90 is also angularly disposed, at an angle with respect to the side of the link, to provide a reference to aid in positioning the file or grinding wheel at the correct angle during resharpening.

The back 98 of inside cutter link 90 is ground precisely at right angle to the side of the link and recedes from cutting edge 94. Further, as has been described in connection with the intermediate cutter link 50, the cutting edge 94 presented to the bottom of the kerf is inclined at a slight angle.

In Figs. 3 and 4 diagrammatic illustrations of sequences of cutter links made in accordance with this invention are illustrated and will now be described. In Fig. 3, a sequence in a saw chain 100 is illustrated which includes outside cutter links bearing saw teeth or cutters 103, 104, adapted to cut the margin of the kerf, successively followed by intermediate side cutter links bearing saw teeth 105, 106 and inside cutter links bearing saw teeth 107, 108. In the arrangement of cutters or saw teeth shown in Fig. 3, a full sequence, which comprises sufficient teeth to remove the entire kerf, begins with the outside teeth or cutters 103, 104 and is completed by the inside teeth or cutters 107, 108. In the operation of a chain made up of sequences as shown in Fig. 3, the individual cutting edges efficiently and uniformly cut small sawdust particles from the bottom of the kerf.

An alternative form of saw chain sequence made up of cutter links according to this invention is shown in Fig. 4 where the complete sequence of the saw chain 109 begins with inside teeth or cutters 110, 111 which are then followed in order by intermediate cutters or teeth 112, 113 and outside cutters or teeth 114, 115. The next following sequence in such a chain would begin with inside cutters or teeth 116, 117 diagrammatically shown in Fig. 4.

In Figs. 3 and 4, the inside saw teeth 107, 108, and 110, 111 for convenience in illustration do not overlap, however in actual practice overlap of the cutting edges on the inside cutter links is provided, to cut the center of the kerf.

The description of the side cutter links of Figs. 5–10, is equally applicable to both right and left hand links. As shown in Figs. 3 and 4, both the right hand and left hand links are sharpened from the outside toward the center-line of the chain and at a cutting angle preferably between 35° and 45°.

The cutters or saw teeth shown in the drawings and hereinbefore described are provided with chisel edges adapted to be formed with a cylindrical file or grinding wheel, however, a chisel edge may be provided with a triangular or flat file positioned so as to place a sharp chisel cutting edge on the side of the tooth and a kerf bottom defining edge on the front of the tooth. The cutting action of a saw chain where all cutters have a similarly detailed cutting edge, is free and fast, with reduced roaming due to the inherent stability of the saw tooth in the cut.

The invention has been described with reference to particular preferred embodiments, and it is understood the details are merely illustrative and that the invention may be carried out in other ways without departing from the true spirit and scope of the appended claim.

I claim:

In a saw chain having side links and center links pivotally connected together, a plurality of cutters carried on side links of the chain making up a sequence to cut the full kerf width, each sequence including a pair of left and right hand outside cutters to plane the side of the kerf and cut the margin of the bottom of the kerf, a pair of left and right hand inside cutters overlapping the center line of the chain to cut the center of the bottom of the kerf, and a pair of left and right hand intermediate cutters to cut the bottom of the kerf between the inside and outside cutters, all cutters having similarly detailed chisel cutting edges formed along one side and the top of each of their front faces, the lateral extent of each of said cutters from said one side to the opposite end of said top cutting edge being substantially the same as the thickness of the cutter-carrying links, said top cutting edges projecting forwardly with respect to the portions of said front faces immediately therebeneath and lying at acute angles with respect to the side faces of said cutter-carrying links, each of said cutter-carrying links also carrying a gauge tooth in front of the cutter thereon for limiting the depth of cut, the portions of said cutter front faces immediately below said forwardly projecting top cutting edges providing recesses conforming to the surfaces of cylinders of the same diameter, whereby said chain is adapted for boring and for sharpening with a round file.

References Cited in the file of this patent

UNITED STATES PATENTS

| | | |
|---|---|---|
| 790,072 | McLean | May 16, 1905 |
| 1,642,145 | Ferguson | Sept. 13, 1927 |
| 2,508,784 | Cox | May 23, 1950 |
| 2,713,276 | Siverson | July 19, 1955 |

FOREIGN PATENTS

| | | |
|---|---|---|
| 127,147 | Austria | Mar. 10, 1932 |
| 564,152 | Great Britain | Sept. 14, 1944 |
| 724,784 | Great Britain | Sept. 23, 1955 |
| 885,477 | Germany | Aug. 6, 1953 |